(12) United States Patent
Kwag et al.

(10) Patent No.: US 7,247,695 B2
(45) Date of Patent: Jul. 24, 2007

(54) HIGH 1,4-CIS POLYBUTADIENE-POLYURETHANE COPOLYMER AND PREPARATION METHOD THEREOF

(75) Inventors: Gwang Hoon Kwag, Daejeon (KR); Sam Min Kim, Daejeon (KR); Young Chan Jang, Daejeon (KR); Pil Sung Kim, Daejeon (KR); Seung Hwon Lee, Daejeon (KR); Seung Hwa Lee, Daejeon (KR); A Ju Kim, Daejeon (KR)

(73) Assignee: Korea Kumho Petrochemical Co., Ltd., Chongno-gu, Seoul (KR)

( * ) Notice: Subject to any disclaimer, the term of this patent is extended or adjusted under 35 U.S.C. 154(b) by 374 days.

(21) Appl. No.: 10/827,001

(22) Filed: Apr. 19, 2004

(65) Prior Publication Data

US 2004/0230010 A1 Nov. 18, 2004

(30) Foreign Application Priority Data

May 15, 2003 (KR) .................... 10-2003-0030805

(51) Int. Cl.
C08F 36/06 (2006.01)
C08F 136/06 (2006.01)

(52) U.S. Cl. .................... 526/335; 528/59; 528/67; 528/85

(58) Field of Classification Search ............... 526/335; 528/59, 67, 85
See application file for complete search history.

(56) References Cited

U.S. PATENT DOCUMENTS

| 4,242,468 A * | 12/1980 | Baack et al. ............... 521/170 |
| 4,260,707 A | 4/1981 | Sylvester et al. |
| 4,429,089 A | 1/1984 | Pedretti et al. |
| 4,444,903 A | 4/1984 | Carbonaro et al. |
| 4,699,962 A | 10/1987 | Hsieh et al. |
| 4,736,001 A | 4/1988 | Carbonaro et al. |
| 5,017,539 A * | 5/1991 | Jenkins et al. ............ 502/102 |
| 5,428,119 A | 6/1995 | Knauf et al. |
| 6,552,153 B1 * | 4/2003 | Kaufhold et al. ........... 528/49 |
| 6,786,839 B2 * | 9/2004 | Hayashi et al. ............. 473/377 |

FOREIGN PATENT DOCUMENTS

| EP | 0011184 | 5/1983 |
| EP | 0092270 | 10/1986 |
| EP | 0375421 | 10/1993 |
| EP | 0267675 | 11/1994 |
| EP | 0652240 | 1/1998 |
| EP | 0713885 | 5/1998 |
| GB | 2 002 003 A * | 2/1979 |
| GB | 2002003 | 2/1979 |
| GB | 2 028 356 A * | 3/1980 |
| WO | WO 02/36615 | 5/2002 |

* cited by examiner

Primary Examiner—Ling-Sui Choi
(74) Attorney, Agent, or Firm—Davidson, Davidson & Kappel, LLC

(57) ABSTRACT

Disclosed is a novel high 1,4-cis polybutadiene-polyurethane copolymer and a preparation method thereof. The present invention provides a high 1,4-cis polybutadiene-polyurethane copolymer represented by the following formula 1 and having an average molecular weight of at least 100,000, and a method for preparing the high 1,4-cis polybutadiene-polyurethane copolymer that includes polymerizing 1,3-butadiene or butadiene derivatives with a catalyst comprising a rare earth compound, a halogen-containing compound and an organoaluminum compound in the presence of a non-polar solvent, to prepare a polybutadiene having a high 1,4-cis content of at least 95%; and then introducing a polyurethane group to the polybutadiene. The high 1,4-cis polybutadiene-polyurethane copolymer thus obtained exhibits low cold flow and high affinity to silica or carbon black in admixture as well as excellent in elasticity and abrasion resistance:

Formula 1

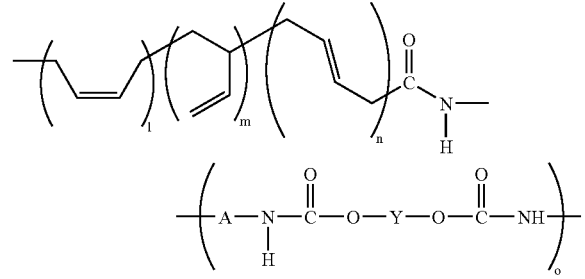

where l, m, n and o represent the number of repeating unit, l is 94 to 99%, m is 0 to 5%, n is 0 to 5%, l+m+n=100%, l/(m+n) is 15 to 100, o is 1 to 100%; and A and Y are $C_1$-$C_{20}$ alkyl or aryl, respectively.

30 Claims, 1 Drawing Sheet

HIGH 1,4-CIS POLYBUTADIENE-POLYURETHANE COPOLYMER AND PREPARATION METHOD THEREOF

BACKGROUND OF THE INVENTION

1. Field of the Invention

This invention relates to a high 1,4-cis polybutadiene-polyurethane copolymer and a preparation method thereof. More specifically, the present invention relates to a method for preparing a high 1,4-cis polybutadiene-polyurethane copolymer that includes preparing a high 1,4-cis polybutadiene-polyurethane copolymer using a copolymer of a high 1,4-cis polybutadiene excellent in elasticity due to its linear molecular structure with high cis stereoregularity and a polyurethane excellent in abrasion resistance, and a rare earth catalyst, and adding an isocyanate compound and an alcohol.

2. Related Prior Art

Methods for preparing a high 1,4-cis polybutadiene using a rare earth catalyst are disclosed in European Patents Nos. 0,011,184 (Bayer AG) and 0,652,240 (Bayer Inc.), and U.S. Pat. Nos. 4,260,707 (Sylvester) and 5,017,539 (Jenkins et al.). In these methods, a high 1,4-cis polybutadiene is prepared by using a neodymium carboxylate compound, an alkylaluminum compound and a Lewis acid in the presence of a non-polar solvent.

U.S. Pat. No. 5,428,119 (Knauf et al.) discloses a method for preparing a high 1,4-cis polybutadiene using a rare earth carboxylate and alkylaluminum compounds such as $R^1AlCl_2$, $R^1{}_2AlCl$ or $R^1{}_3Al_2Cl_3$ (where $R^1$ is $C_8$-$C_{12}$ alkyl) and $R^2{}_2AlH$ (where $R^2$ is $C_2$-$C_6$ alkyl).

UK Patent No. 2,002,003 (ANIC S.p.A.) and U.S. Pat. No. 4,429,089 (Pedretti et al.) suggest a method for preparing a high 1,4-cis polybutadiene using $AlR_2X$ (where R is hydrogen or alkyl; and X is hydrogen, alkoxy or alkoxy sulfide), alkyl aluminum, and a neodymium compound.

European Patent No. 0,092,270 (Enichem Polimeri S.p.A.) and U.S. Pat. No. 4,444,903 (Carbonaro et al.) propose a method for preparing a high 1,4-cis polybutadiene using a catalyst system comprising a rare earth metal, alkyl aluminum, and t-alkyl halogen. U.S. Pat. No. 4,736,001 (Carbonaro et al.) describes a method for preparing high 1,4-cis polybutadiene using the above-mentioned catalyst system without a solvent.

In addition, U.S. Pat. No. 4,699,962 (Hsieh et al.) discloses a synthetic method of high 1,4-cis polybutadiene using a catalyst system prepared by mixing a neodymium hydride compound, a chloride compound and an electron-donating ligand, and then adding an alkyl aluminum compound.

European Patent No. 375,421 (Enichem Elastomers Limited) and U.S. Pat. No. 5,017,539 (Jenkins et al.) also describe a synthetic method of high 1,4-cis polybutadiene by aging a neodymium compound, an organohalide compound and an organoaluminum compound at 0° C. or less.

In applications of the high 1,4-cis polybutadiene, the terminal of the polybutadiene is modified so as to control viscosity or affinity to additives in post-admixture. More specifically, the terminal of polybutadiene is modified epoxy or isocyanate by using the living property of the neodymium catalyst as mentioned in, for example, WIPO Publication No. 02/36615 (Applied Molecular Evolution, Inc.), and European Patents Nos. 0,713 885 (Nippon Zeon Co., Ltd) and 0,0267 675 (Japan Synthetic Rubber Co., Ltd.).

A low 1,4-cis polybutadiene-polyurethane copolymer that is the copolymer of low 1,4-cis polybutadiene and polyurethane is disclosed in documents (*Makrmol. Chem.* 1983, 651; *Adv. Polym. Sci.* 2002, 21, 25; *Plasty a kaucuk* 2002, 39, 68). In the cited documents, the polybutadiene is a hydroxyl-modified polybutadiene synthesized by using an anionic polymerization catalyst. More specifically, the polybutadiene is a low 1,4-cis polybutadiene having a 1,4-vinyl content of about 35%, a 1,4-vinyl content of about 30% and a 1,4-cis content of about 10 to 30%, with a small molecular weight of about 3000. The synthetic method of low 1,4-cis polybutadiene-polyurethane copolymer is comprised of three steps that include polymerization of polybutadiene with an anionic catalyst such as butyl lithium, adding an epoxy compound to prepare hydroxyl polybutadiene; and adding an isocyanate compound to yield low 1,4-cis polybutadiene-polyurethane copolymer. Low 1,4-cis polybutadiene-polyurethane copolymer thus synthesized is used as a resin modifier.

SUMMARY OF THE INVENTION

It is therefore an object of the present invention to provide a novel elastomer that introduces polyurethane with high abrasion resistance and weather resistance to high 1,4-cis polybutadiene excellent in elasticity with a high stereoregularity and a high molecular weight. More specifically, the object of the present invention is to introduce a polyurethane to a neodymium-polybutadiene having high stereoregularity and high molecular weight and good elasticity due to its linear molecular structure using an isocyanate compound having at least two functional groups and an alcohol having at least two functional groups with or without base or tin catalyst, and thereby to provide a novel elastomer possessing high abrasion resistance and weather resistance of polyurethane in addition to excellent elasticity of polybutadiene with high stereoregularity and high linearity.

It is another object of the present invention to provide a method for preparing a high 1,4-cis polybutadiene-polyurethane copolymer preferable as a rubber with high abrasion resistance and high elasticity that includes preparing a polybutadiene having a high 1,4-cis content of at least 95% with a polymerization catalyst comprised of a rare earth compound, a halogen-containing compound and an organoaluminum compound in the presence of a non-polar solvent; and then reacting with an isocyanate compound having at least two functional groups and an alcohol compound having at least two functional groups with or without base or tin catalyst to obtain the resultant high 1,4-cis polybutadiene polyurethane copolymer.

To achieve the above objects of the present invention, there is provided a high 1,4-cis polybutadiene-polyurethane copolymer represented by the following formula 1:

Formula 1

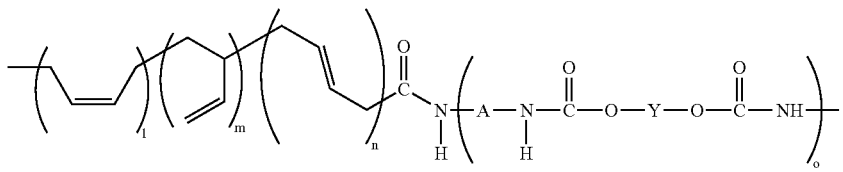

where l, m, n and o represent the number of repeating unit, l is 94 to 99%, m is 0 to 5%, n is 0 to 5%, l+m+n=100%, l/(m+n) is 15 to 100, and o is 1 to 100%; and A and Y are $C_1$-$C_{20}$ alkyl or aryl.

In another aspect of the present invention, there is provided a method for preparing the high 1,4-cis polybutadiene-polyurethane copolymer of the present invention that includes: (a) polymerizing 1,3-butadiene or its derivatives with a catalyst comprising a rare earth compound, a halogen-containing compound and an organoaluminum compound in the presence of a non-polar solvent, to prepare a polybutadiene having a high 1,4-cis content of at least 95%; and (b) adding an isocyanate compound having at least two functional groups and an alcohol compound having at least two functional groups with or without base or tin catalyst to the result of the step (a).

The term "rare earth" as used herein refers to elements from Lanthanum (La; 57) to Lutetium (Lu; 71).

The term "high 1,4-cis polybutadiene" as used herein refers to a polybutadiene having a cis content of at least 95%.

The present invention will be described in further detail as follows.

The high 1,4-cis polybutadiene-polyurethane copolymer according to the present invention is synthesized by polymerizing 1,3-butadiene for a high 1,4-cis polybutadiene using a rare earth catalyst and then adding an isocyanate compound having at least two functional groups and an alcohol having at least two functional groups with or without base or tin catalyst to yield a polybutadiene-polyurethane copolymer.

Conventionally, low 1,4-cis polybutadiene-polyurethane is synthesized by the three steps using an anionic catalyst; 1) butadiene polymerizaton, 2) preparation of hydroxyl-terminal polybutadiene with an epoxy compound, 3) polybutadiene-polyurethane copolymerization with an isocyanate compound. However, as for preparation of high 1,4-cis polybutadiene-polyurethane, the reactivity of the active-end of high cis polybutadiene with epoxy compound is too low to form hydroxy high 1,4-cis polybutadiene.

Hence, our invention for high 1,4-cis polybutadiene-polyurethane copolymer is made without the second step of reacting with epoxy. The active-end of high 1,4-cis polybutadiene obtained with monomeric neodymium catalyst is directly reacted with an isocyanate compound having at least two functional groups, and further an alcohol having at least two functional groups is added with base or tin catalyst.

In the reaction, isocyanate compound is attached to the terminal of the high 1,4-cis polybutadiene, while other unreacted isocyanate functional groups react with alcohol to yield urethane functionality.

The preparation of high 1,4-cis polybutadiene-polyurethane copolymer according to the present invention involves polymerizing 1,3-butadiene or its derivatives using a polymerization catalyst comprised of a rare earth compound, a halogen-containing compound and an organoaluminum compound in the presence of a non-polar solvent to yield high 1,4-cis polybutadiene, and then adding an isocyanate compound having at least two functional groups and an alcohol having at least two functional groups with or without base or tin catalyst.

The isocyanate compound having at least two functional groups useful in the synthesis of polyurethane is represented by the following formula 2 and selected from, for example, $C_1$-$C_{20}$ alkyl diisocyanate, $C_1$-$C_{20}$ alkyl triisocyanate, $C_1$-$C_{20}$ alkyl tetraisocyanate, $C_1$-$C_{20}$ aromatic diisocyanate, $C_1$-$C_{20}$ aromatic triisocyanate, or $C_1$-$C_{20}$ aromatic tetraisocyanate. The specific examples of the isocyanate compounds may include alkyl or aryl diisocyanates such as hexyl diisocyanate, octyl diisocyanate, toluene diisocyanate, and methylene diphenyl diisocyanate; alkyl or aryl triisocyanates such as hexyl triisocyanate, octyl triisocyanate and methylene triphenyl triisocyanate; or polymeric compounds such as dodecyl tetraisocyanate and methylene diphenyl diisocyanate.

Formula 2 where R is $C_1$-$C_{20}$ alkyl or aryl; and n is an integer of 2, 3 or 4.

Among these isocyanate compounds, the monomer of methylene triphenyl triisocyanate (hereinafter, referred to as "TPI") or methylene diphenyl diisocyanate containing at least three isocyanate groups, i.e., polymethylene diphenyl diisocyanate (hereinafter, referred to as "PMDI") is most preferred.

The added amount of the diisocyanate compound having at least two functional groups is preferably in the range of 0.01 to 50.0 parts by weight with respect to 100 parts by weight of the polybutadiene.

The alcohol compound having at least two functional groups is represented by the following formula 3 and selected from, for example, $C_1$-$C_{20}$ alkyl diol, $C_1$-$C_{20}$ alkyl triol, $C_1$-$C_{20}$ alkyl tetraol, $C_1$-$C_{20}$ aromatic diol, $C_1$-$C_{20}$ aromatic triol, or $C_1$-$C_{20}$ aromatic tetraol. The specific examples of the alcohol may include ethylene glycol, glycerol, polyethylene glycol, hexanediol, butanetriol, or pentaerythritol.

Formula 3 where R' is $C_1$-$C_{20}$ alkyl or aryl; and m is an integer of 2 to 10.

The added amount of the alcohol is preferably in the range of 0.01 to 50 g per 100 g of the polybutadiene.

The catalyst used for the polymerization of high 1,4-cis polybutadiene is comprised of a rare earth compound, a halogen-containing compound and an organoaluminum compound, as previously described, and its compositional ingredient is given as follows.

First, the rare earth compound includes a rare earth salt comprising an organic acid or an inorganic acid. The organic acids having a high solubility in an organic solvent are preferred, and among the organic acids, carboxylates are most preferred. The carboxylates as used herein are saturated, unsaturated, cyclic or linear carboxylates, such as octoate, naphthenate, versatate, or steate. The specific examples of the rare earth carboxylates may include neodymium versatate, neodymium octoate and neodymium naphthenate. Among the rare earth compounds, neodymium versatate is most preferred in the aspect of activity and polymer properties.

The halogen compound includes a halogen-containing Lewis acid or an organohalogen compound readily serving as a donor of halogen. Preferably, the halogen-containing Lewis acid includes an aluminum compound represented by $MX_nR^1_{3-n}$, wherein M is aluminium, boron, silicon, tin or titanium (in case of silicon, tin or titanium, represented by $MX_nR^1_{4-n}$); X is halogen atom; $R^1$ is $C_1$-$C_{10}$ alkyl or aryl, or hydrogen; and n is 1 or 2. Among these organohalogen compounds, t-alkyl halogen compounds such as t-butyl halogen are most preferred.

The organoaluminum compound is represented by $AlR^2_3$, where $R^2$ is $C_1$-$C_{10}$ alkyl or aryl, or hydrogen, and specifically includes trimethyl aluminum, triethyl aluminum, tripropyl aluminum, tributyl aluminum, triisobutyl aluminum, trihexyl aluminum, or diisobutyl aluminum hydride.

To enhance the living character in the above-stated rare earth catalyst system, a Lewis base such as organic amine, organic phosphor can be used. The specific examples of the Lewis base as used herein may include tetramethylethylenediamine, triethylamine, triphenylphosphine, tributylphosphine, or tetrahydrofurane.

The specific examples of butadiene or butadiene derivatives as used herein may include 1,3-butadiene, isoprene, 1,3-pentadiene, 2,3-dimethyl-1,3-butadiene, or myrcene.

Regarding the composition of the polymerization catalyst, the molar ratio of neodymium to chlorine is in the range of 1:1 to 1:20, and the molar ratio of neodymium to alkylaluminum is in the range of 1:20 to 1:100.

The solvent of the catalyst is necessarily a non-polar solvent, not reactive to the catalyst, for example, cyclohexane, hexane, or heptane.

1,3-Butadiene can be added during the ageing of the catalyst. This may maintain the activity of the catalyst, prevents precipitation, and affects the physical properties of the rubber. The added amount of 1,3-butadiene is preferably 1 to 10-fold weight of neodymium.

As for the charging order of the catalyst ingredients in the synthesis of the aged catalyst, a catalyst solution of a rare earth compound containing 1,3-butadiene is first added in a catalytic reactor in a nitrogen atmosphere and a halogen compound and an organoaluminum compound are then added. The charging order of the ingredients is variable according to the process and the catalyst ingredients can be added in the reactor without the ageing process.

The ageing temperature and the ageing time also affect the properties of the polymer. Preferably, the ageing time is between 5 minutes and two hours, and the ageing temperature is −30 to 60° C.

The polymerization solvent is necessarily used in the oxygen- or moisture-free condition. The useful solvent for polymerization is preferably a non-polar solvent such as cyclohexane, hexane, heptane, or toluene. The specific examples of the non-polar solvent may include at least one aliphatic hydrocarbon such as butane, pentane, hexane, isopentane, heptane, octane, or isooctane; or cycloaliphatic hydrocarbon such as cyclopentane, methylcyclopentane, cyclohexane, methylcyclohexane, or ethylcyclohexane. Benzene, ethylbenzene, or xylene can also be used as the non-polar solvent. The polymerization solvent must be used in the oxygen- or moisture-free condition so as to be used directly for the polymerization of 1,3-butadiene.

The weight ratio of 1,3-butadine or butadiene derivatives to solvent is 10:1 to 1:1.

Polymerization is initiated in a high-purity nitrogen atmosphere, and the polymerization temperature is preferably in the range of −20 to 100° C. Under the appropriate catalytic conditions, the polymerization time is preferably in the range of 30 minutes to 3 hours with a yield of at least 70%.

The polymerization of 1,3-butadiene or its derivative using the above-stated catalyst system results in a high 1,4-cis polybutadiene having a cis content of at least 95% and a molecular weight of 10,000 to 2,000,000.

In the embodiment of the present invention, a solution polymerization is carried out with a non-polar solvent and 1,3-butadiene for preparation high 1,4-cis polybutadiene-polyurethane copolymer.

After the synthesis of high 1,4-cis polybutadiene, an isocyanate compound having at least two functional groups and an alcohol having at least two functional groups with without base or tin catalyst as described above are added. Preferably, the reaction time is from 5 minutes to 2 hours and the reaction temperature is between 20 and 150° C.

Also, in this step, the base or tin catalyst can be used in the present invention include triethyl amine, triethylamine, tetrabutyl tin, dibutyldilaurylate tin or tetrachloro tin.

The addition of the isocyanate compound having at least two functional groups and the alcohol having at least two functional groups also controls cold flow of polybutadiene. Generally, the neodymium-polybutadiene possesses high cold flow due to its linear molecular structure. But, the other copolymer unit, polyurethane, formed by the condensation reaction of isocyanate compound and alcohol in the present invention to reduce cold flow by hydrogenation of amide between polyurethane chain.

Finally, 2,6-di-t-butylparacresol is added as an antioxidant after the reaction, and methyl alcohol or ethyl alcohol is then used to terminate the reaction.

DETAILED DESCRIPTION OF THE INVENTION

Figure 1:
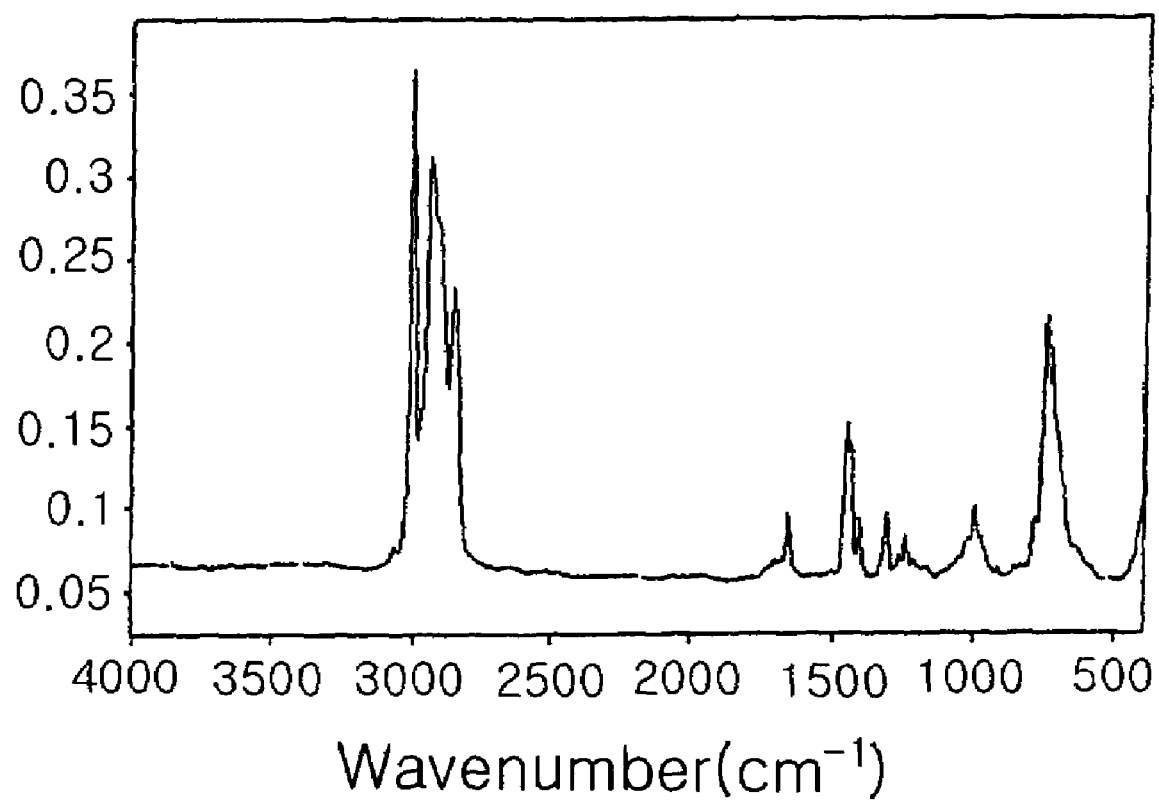
FIG. 1 represents the infrared spectrum of the high 1,4-cis polybutadiene-polyurethane copolymer obtained method of the present invention.

Hereinafter, the present invention will be described in further detail as set forth hereunder by way of the following examples, which are not intended to limit the present invention.

EXAMPLE 1

The Ziegler-Natta catalyst used for the reaction was comprised of neodymium versatate (1.0% cyclohexane solution), diethylaluminum chloride (1M cyclohexane solution), diisobutylaluminum hydride (15% n-hexane solution) and triisobutylaluminum (1M n-heptane solution), which catalysts were mixed at a mole ratio of 1:25:4:2.5. $1.0 \times 10^{-4}$ mole of the neodymium catalyst was used per 100 g of 1,3-butadiene. The content of a polymerization solvent was five-fold of the monomer weight.

After nitrogen was sufficiently blown into a 5-L pressure glass reactor, cyclohexane, triisobutylaluminum and diisobutylaluminum hydride were added and then diethylaluminum chloride and neodymium versatate were added. Subsequently, butadiene (400 g) was added for polymerization at 70° C. for 1 hour.

To the product thus obtained were added methylene triphenyl triisocyanate (TPI, 0.3 phr) and pentaerythritol (0.3 phr), and the mixture was stirred for one hour. Finally, 2,6-di-t-buytl-p-cresol as an antioxidant, and ethanol were added to terminate the reaction. The amide group was identified with an infrared spectrometer (Refer to FIG. 1, 3300~3500, 1700 cm$^{-1}$).

EXAMPLE 2

The same polymerization condition of preparing polybutadiene as described in Example 1 was provided, excepting the composition of the catalyst as presented in Table 1.

To the polybutadiene unit thus obtained were added polymethylene diphenyl diisocyanate (0.3 phr) and ethylene glycol (0.3 phr), and the mixture was stirred for one hour. Finally, 2,6-di-t-butyl-p-cresol as an antioxidant, and ethanol were added to terminate the reaction. The amide group was identified with an infrared spectrometer (Refer to FIG. 1, 3300~3500, 1700 cm$^{-1}$).

EXAMPLE 3

The same polymerization condition of preparing polybutadiene as described in Example 1 was provided to synthesize polybutadiene.

To the polybutadiene unit thus obtained were added polymethylene diphenyl diisocyanate (0.3 phr) and ethylene glycol (0.6 phr), and the mixture was stirred for one hour. Finally, 2,6-di-t-butyl-p-cresol as an antioxidant, and ethanol were added to terminate the reaction. The amide group was identified with an infrared spectrometer (Refer to FIG. 1, 3300~3500, 1700 cm$^{-1}$).

EXAMPLE 4

The same polymerization condition of preparing polybutadiene as described in Example 1 was provided, excepting the composition of the catalyst as presented in Table 1.

To the polybutadiene unit thus obtained were added polymethylene diphenyl diisocyanate (0.3 phr) and glycerol (1.2 phr), and the mixture was stirred for one hour. Finally, 2,6-di-t-butyl-p-cresol as an antioxidant, and ethanol were added to terminate the reaction. The amide group was identified with an infrared spectrometer (Refer to FIG. 1, 3300~3500, 1700 cm$^{-1}$).

EXAMPLE 5

The same polymerization condition of preparing polybutadiene as described in Example 1 were provided, excepting the composition of the catalyst as presented in Table 1.

To the polybutadiene unit thus obtained were added polymethylene diphenyl diisocyanate (0.6 phr) and propylene glycol (1.2 phr), and the mixture was stirred for one hour. Finally, 2,6-di-t-butyl-p-cresol as an antioxidant, and ethanol were added to terminate the reaction. The amide group was identified with an infrared spectrometer (Refer to FIG. 1, 3300~3500, 1700 cm$^{-1}$).

EXAMPLE 6

The same polymerization condition of preparing polybutadiene as described in Example 1 were provided, excepting the composition of the catalyst as presented in Table 1.

To the polybutadiene unit thus obtained were added methylene diphenyl diisocyanate (0.3 phr) and dipentylerythritol (0.6 phr), and the mixture was stirred for one hour. Finally, 2,6-di-t-butyl-p-cresol as an antioxidant, and ethanol were added to terminate the reaction. The amide group was identified with an infrared spectrometer (Refer to FIG. 1, 3300~3500, 1700 cm$^{-1}$).

EXAMPLE 7

The same polymerization condition of preparing polybutadiene as described in Example 1 were provided, excepting the composition of the catalyst as presented in Table 1.

To the polybutadiene unit thus obtained were added polymethylene diphenyl diisocyanate (0.3 phr) and pentaerythritol propylate (0.6 phr, ca, $M_n$ 425), and the mixture was stirred for one hour. Finally, 2,6-di-t-butyl-p-cresol as an antioxidant, and ethanol were added to terminate the reaction. The amide group was identified with an infrared spectrometer (Refer to FIG. 1, 3300~3500, 1700 cm$^{-1}$).

EXAMPLE 8

The same polymerization condition of preparing polybutadiene as described in Example 7 were provided, excepting the composition of the catalyst as presented in Table 1.

To the polybutadiene unit thus obtained were added polymethylene diphenyl diisocyanate (5.0 phr) and pentaerythritol propylate (2.0 phr, ca, $M_n$ 425), dibutyldilaurylatetin (0.1 g) and the mixture was stirred for one hour. Finally, 2,6-di-t-butyl-p-cresol as an antioxidant, and ethanol were added to terminate the reaction. The amide group was identified with an infrared spectrometer (Refer to FIG. 1, 3300~3500, 1700 cm$^{-1}$).

EXAMPLE 9

The same polymerization condition of preparing polybutadiene as described in Example 7 were provided, excepting the composition of the catalyst as presented in Table 1.

To the polybutadiene unit thus obtained were added polymethylene diphenyl diisocyanate (10.0 phr) and pentaerythritol propylate (4.0 phr, ca, $M_n$ 425), triibutylamin (0.1 g) and the mixture was stirred for one hour. Finally, 2,6-di-t-butyl-p-cresol as an antioxidant, and ethanol were added to terminate the reaction. The amide group was identified with an infrared spectrometer (Refer to FIG. 1, 3300~3500, 1700 cm$^{-1}$).

Polymerization temperature, catalyst composition and polymerization conditions according to Examples 1 to 9 are presented in Table 1.

TABLE 1

| Example | Amount of Nd Catalyst ($\times 10^{-4}$ mol) | Molar ratio of catalyst (Nd:TIBA:DIBAL:DIEC) | Polymerization Temperature (° C.) | Added Amount of Isocyanate (phr) | Added Amount of Alcohol (phr) |
|---|---|---|---|---|---|
| 1 | 1.0 | 1:25:4:2.5 | 70 | 0.3 | 0.3 |
| 2 | 1.0 | 1:20:5:2.5 | 70 | 0.3 | 0.3 |
| 3 | 1.0 | 1:20:4:2.5 | 70 | 0.3 | 0.6 |
| 4 | 1.2 | 1:20:7:2 | 70 | 0.3 | 1.2 |
| 5 | 1.0 | 1:20:10:3 | 70 | 0.6 | 1.2 |
| 6 | 1.5 | 1:30:4:3 | 70 | 0.3 | 0.6 |
| 7 | 1.5 | 1:30:5:3 | 70 | 0.3 | 0.6 |
| 8 | 1.5 | 1:30:5:3 | 70 | 5.0 | 2.0 |
| 9 | 1.5 | 1:30:5:3 | 70 | 10.0 | 4.0 |

Nd: neodymium versatate [Nd(versatate)$_3$(versatic acid)]
DIEC: diethylaluminum chloride (Et$_2$AlCl)
DIBAL: diisobutylaluminum hydride (Al(iBu)$_2$H)
TIBA: triisobutylaluminum (Al(iBu)$_3$)

The unit of high 1,4-cis polybutadiene and high 1,4-cis polybutadiene-polyurethane copolymer thus obtained according to Examples 1 to 9 were analyzed in regard to cis content, molecular weight, and Mooney viscosity. The results are presented in Table 2.

TABLE 2

| Example | Cis content (%) | High 1,4-cis PB $M_w$ | MWD | Mooney Viscosity | High 1,4-cis PB-PU copolymer $M_w$ | MWD | Mooney Viscosity |
|---|---|---|---|---|---|---|---|
| 1 | 98.7 | 851,300 | 2.70 | 59.5 | 872,500 | 2.89 | 70.0 |
| 2 | 98.6 | 627,400 | 2.81 | 42.0 | 649,600 | 2.96 | 51.0 |
| 3 | 98.6 | 652,700 | 2.93 | 49.5 | 695,900 | 3.10 | 61.0 |
| 4 | 98.4 | 613,500 | 2.86 | 37.5 | 664,800 | 3.08 | 46.0 |
| 5 | 98.5 | 302,000 | 2.42 | 27.5 | 321,400 | 2.65 | 33.5 |
| 6 | 98.2 | 550,400 | 2.73 | 32.5 | 622,400 | 2.93 | 42.5 |
| 7 | 98.3 | 583,600 | 2.64 | 35.5 | 620,600 | 2.84 | 43.0 |
| 8 | 98.2 | 563,200 | 2.67 | 33.2 | 723,200 | 2.95 | 51.2 |
| 9 | 98.3 | 573,200 | 2.55 | 32.9 | 823,700 | 3.25 | 64.9 | note)
$M_w$: weight-average molecular weight
MWD: molecular weight distribution
Mooney viscosity: $ML_{1+4}$, 100° C.

In the case of Examples 1 to 9, the high cis polybutadiene synthesized with neodymium catalyst was reacted with an isocyanate compound having at least two functional groups and an alcohol having at least two functional groups to yield a multi-branched high 1,4-cis polybutadiene-polyurethane copolymer.

The comparison of vulcanized properties between the homopolymer of polybutadiene copolymer of high 1,4-cis polybutadiene-polyurethane is provided in Table 3.

TABLE 3

| | | 1,4-cis polybutadiene synthesized by neodymium catalyst | High 1,4-cis polybutadiene-polyurethane copolymer |
|---|---|---|---|
| MV | RAW ($ML_{1+4}$, 100° C.) | 47 | 50 |
| Tensile | Hardness (shore-A/5 sec) | 61.5 | 61.5 |
| | 300% modulus (kg/cm$^2$) | 111.5 | 116.2 |
| | Tensile strength (kg/cm$^2$) | 138.5 | 154 |
| | Elongation at break (%) | 360 | 371 |
| H.B.U (° C.) | | 32.3 | 28.3 |
| Rebound (%) | | 53.4 | 56.5 |
| Abrasion (mg) | | 0.0183 | 0.0155 |

As can be seen from the results of Table 3, the high 1,4-cis polybutadiene-polyurethane copolymer was excellent in tensile strength, heat build-up (H.B.U) and abrasion resistance. Particularly, the H.B.U was enhanced by at least 20%.

As described above, high 1,4-cis polybutadiene-polyurethane copolymer, which was prepared by (a) polymerizing 1,3-butadiene or its derivatives with a polymerization catalyst comprising a rare earth compound, a halogen-containing compound and an organoaluminum compound in the presence of a non-polar solvent to yield high 1,4-cis polybutadiene unit, and (b) then adding an isocyanate compound having at least two functional groups and an alcohol compound having at least two functional groups with or without base or tin catalyst for polyurethane unit. The copolymer of high cis polybutadiene-polyurethane shows enhanced abrasion resistance and H.B.U compared with those of the homopolymer of high cis 1,4-polybutadiene.

What is claimed is:

1. A method for preparing a high 1,4-cis polybutadiene-polyurethane copolymer represented by the following formula 1:

Formula 1

$$\left( \vphantom{\Big|} \right)_l \left( \vphantom{\Big|} \right)_m \left( \overset{\displaystyle O}{\underset{\displaystyle }{\overset{\|}{C}}}\!-\!\overset{\displaystyle }{\underset{\displaystyle H}{N}}\!- \right)_n$$

$$\left( \!-\!A\!-\!\overset{\displaystyle }{\underset{\displaystyle H}{N}}\!-\!\overset{\displaystyle O}{\overset{\|}{C}}\!-\!O\!-\!Y\!-\!O\!-\!\overset{\displaystyle O}{\overset{\|}{C}}\!-\!NH\!- \right)_o$$

wherein l, m, n and o represent the number of repeating unit, l is 94 to 99%, m is 0 to 5%, n is 0 to 5%, l+m+n=100%, l/(m+n) is 15 to 100, o is 1 to 100%; and A and Y are $C_1$-$C_{20}$ alkyl or aryl, the method comprising;

(a) polymerizing 1,3-butadiene or butadiene derivatives with a catalyst comprising a rare earth compound, a halogen-containing compound and an organoaluminum compound in the presence of a non-polar solvent, to prepare polybutadiene having a high 1,4-cis content of at least 95% except monohydroxy-terminated polybutadiene; and (b) adding an isocyanate compound having at least two functional groups and an alcohol compound having at least two functional groups with or without base or tin catalyst to the result of the step (a).

2. The method as claimed in claim 1, wherein the isocyanate compound having at least two functional groups is represented by the following formula 2:

$$R\text{-}(NCO)_n \qquad \text{Formula 2}$$

wherein R is $C_1$-$C_{20}$or alkyl or aryl; and n is an integer of 2 to 4.

3. The method as claimed in claim 1, wherein the isocyanate compound having at least two functional groups is selected from the group consisting of $C_1$-$C_{20}$ alkyl diisocyanate, $C_1$-$C_{20}$ alkyl triisocyanate, $C_1$-$C_{20}$ alkyl tetraisocyanate, $C_1$-$C_{20}$ aromatic diisocyanate, $C_1C_{20}$ aromatic triisocyanate, or $C_1$-$C_{20}$ aromatic tetraisocyanare.

4. The method as claimed in claim 2, wherein the isocyanate compound having at least two functional groups is selected from the group consisting of $C_1$-$C_{20}$ alkyl diisocyanate, $C_1$-$C_{20}$ alkyl triisocyanate, $C_1$-$C_{20}$ alkyl tetraisocyanate, $C_1$-$C_{20}$ aromatic diisocyanate, $C_1$-$C_{20}$ aromatic triisocyanate, or $C_1$-$C_{20}$ aromatic tetraisocyanate.

5. The method as claimed in claim 1, wherein the isocysnate compound having at least two functional groups includes polymethylene diphenyl diisocyanate.

6. The method as claimed in claim 2, wherein the isocyanate compound having at least two functional groups includes polymethylene diphenyl diisocyanate.

7. The method as claimed in claim 1, wherein the isocyanate compound having at least two functional groups is used in an amount of 0.01 to 50 parts by weight with respect to 100 parts by weight of the polybutadiene having a high 1,4-cis content of at least 95%.

8. The method as claimed in claim 1, wherein the alcohol compound having at least two functional groups is represented by the following formula 3:

$$R'\text{—}(OH)_m \qquad \text{Formula 3}$$

wherein R' is $C_1$-$C_{20}$ alkyl or aryl; and m is an integer of 2 to 10.

9. The method as claimed in claim 1, wherein the alcohol compound having at least two functional groups is selected from the group consisting of $C_1$-$C_{20}$ alkyl diol, $C_1$-$C_{20}$ alkyl triol, $C_1$-$C_{20}$ alkyl tetraol, $C_1$-$C_{20}$ aromatic diol, $C_1$-$C_{20}$ aromatic triol, or $C_1$-$C_{20}$ aromatic tetraol.

10. The method as claimed in claim 8, wherein the alcohol compound having at least two functional groups is selected from the group consisting of $C_1$-$C_{20}$ alkyl diol, $C_1$-$C_{20}$ alkyl triol, $C_1$-$C_{20}$ alkyl tetraol, $C_1$-$C_{20}$ aromatic diol, $C_1$-$C_{20}$ aromatic triol, or $C_1$-$C_{20}$ aromatic tetraol.

11. The method as claimed in claim 1, wherein the alcohol compound having at least two functional groups includes glycol.

12. The method as claimed in claim 8, wherein the alcohol compound having at least two functional groups includes glycol.

13. The method as claimed in claim 1, wherein the alcohol compound having at least two functional groups is used in an amount of 0.01 to 50 parts by weight with respect to 100 parts by weight of the polybutadiene having a high 1,4-cis content of at least 95%.

14. The method as claimed in claim 1, wherein the butadiene derivatives include isoprene, 1,3-pentadiene, 2,3-dimethyl-1,3-butadiene, myrcene, their mixtures or derivatives.

15. The method as claimed in claim 1, wherein the rare earth compound includes a rare earth organic acid, or a rare earth inorganic acid.

16. The method as claimed in claim 15, wherein the rare earth organic acid includes rare earth carboxylate.

17. The method as claimed in claim 16, wherein the rare earth carboxylate includes a carboxylate selected from $C_8$-$C_{20}$ saturated, unsaturated, cyclic or linear octoate, naphthenate, versatate, or steate.

18. The method as claimed in claim 17, wherein the rare earth carboxylate is selected from neodymium versatate, neodymium octoate, or neodymium naphthenate.

19. The method as claimed in claim 1, wherein the halogen-containing compound includes a halogen-containing Lewis acid and organohalogen compound readily serving as a donor of halogen.

20. The method as claimed in claim 19, wherein the halogen-containing Lewis acid is selected from an aluminum compound represented by $MX_nR^1_{3-n}$, wherein M is aluminium, boron, silicon, tin or titanium; X is halogen atoms; $R^1$ is $C_1$-$C_{10}$ alkyl or aryl, or hydrogen; and n is 1 or 2.

21. The method as claimed in claim 19, wherein the organohalogen compound includes t-alkyl halogen compounds.

22. The method as claimed in claim 1, wherein the organoaluminum compound is selected from the group consisting of trimethyl aluminum, triethyl aluminum, tripropyl aluminum, tributyl aluminum, triisobutyl aluminum, trihexyl aluminum, or diisobutyl aluminum hydride, as represented by $AlR^2_3$, wherein $R^2$ is $C_1$-$C_{10}$ alkyl or aryl, or hydrogen.

23. The method as claimed in claim 1, wherein the non-polar solvent is selected from butane, pentane, hexane, isopentane, heptane, octane, isooctane, cyclopentane, methylcyclopentane, cyclohexane, methylcyclohexane, ethylcyclohexane, benzene, toluene, ethylbenzene, or xylene.

24. The method as claimed in claim 1, wherein the catalyst is used to provide a molar ratio of rare earth compound to chlorine element in the range from 1:1 to 1:20.

25. The method as claimed in claim 1, wherein the catalyst is used to provide a molar ratio of rare earth compound to alkylaluminum in the range from 1:20 to 1:100.

26. The method as claimed in claim 1, wherein the weight ratio of 1,3-butadiene or butadiene derivative to solvent is 10:1~1:1.

27. The method as claimed in claim 1, wherein the step (a) is performed a reaction time of 30 minutes to 3 hours.

28. The method as claimed in claim 3, wherein the step (a) is performed a reaction temperature of −20 to 100° C.

29. The method as claimed in claim 1, wherein the step (b) is performed a reaction time of 5 minutes to 2 hours.

30. The method as claimed in claim 1, wherein the step (b) is performed a reaction temperature of 20 to 150° C.

* * * * *